(12) United States Patent
Popp et al.

(10) Patent No.: US 12,574,634 B2
(45) Date of Patent: Mar. 10, 2026

(54) METHOD OF CONNECTING CAMERA MODULES TO A CAMERA

(71) Applicant: Arnold & Richter Cine Technik GmbH & Co. Betriebs KG, Munich (DE)

(72) Inventors: Hermann Popp, Munich (DE); Frank Zeidler, Munich (DE); Alexander Mann, Munich (DE); Michael Haubmann, Vienna (AT)

(73) Assignee: Arnold & Richter Cine Technik Gmbh & Co. Betriebs KG, Munich (DE)

( * ) Notice: Subject to any disclaimer, the term of this patent is extended or adjusted under 35 U.S.C. 154(b) by 362 days.

(21) Appl. No.: 18/113,751

(22) Filed: Feb. 24, 2023

(65) Prior Publication Data

US 2023/0269466 A1 Aug. 24, 2023

(30) Foreign Application Priority Data

Feb. 24, 2022 (DE) ..................... 10 2022 104 408.4

(51) Int. Cl.
*H04N 23/661* (2023.01)
*H04N 23/57* (2023.01)
*H04N 23/617* (2023.01)

(52) U.S. Cl.
CPC ........... *H04N 23/661* (2023.01); *H04N 23/57* (2023.01); *H04N 23/617* (2023.01)

(58) Field of Classification Search
CPC combination set(s) only.
See application file for complete search history.

(56) References Cited

U.S. PATENT DOCUMENTS

2009/0237512 A1* 9/2009 Liu ........................ H04N 23/57
348/207.1
2010/0111489 A1 5/2010 Presler
(Continued)

FOREIGN PATENT DOCUMENTS

WO 2016134318 A1 8/2016

OTHER PUBLICATIONS

German Patent and Trademark Office Search Report issued in Application No. 10 2022 104 408.4, dated Oct. 10, 2022.
(Continued)

*Primary Examiner* — Sinh Tran
*Assistant Examiner* — Zhenzhen Wu
(74) *Attorney, Agent, or Firm* — Amster, Rothstein & Ebenstein LLP

(57) ABSTRACT

The present invention relates to a method of connecting camera modules to a camera, in which the camera is connected to a first camera module via a data interface, the first camera module transmits a device profile via the data interface to the camera, wherein the device profile comprises a device class of the first camera module and information about the functional scope of the first camera module, the camera is connected to a second camera module via the data interface, the second camera module transmits a device profile via the data interface to the camera, wherein the device profile comprises a device class of the second camera module and information about the functional scope of the second camera module, the camera adapts its operating parameters to the first and second camera module based on the device profiles in (Continued)

Figure 1:
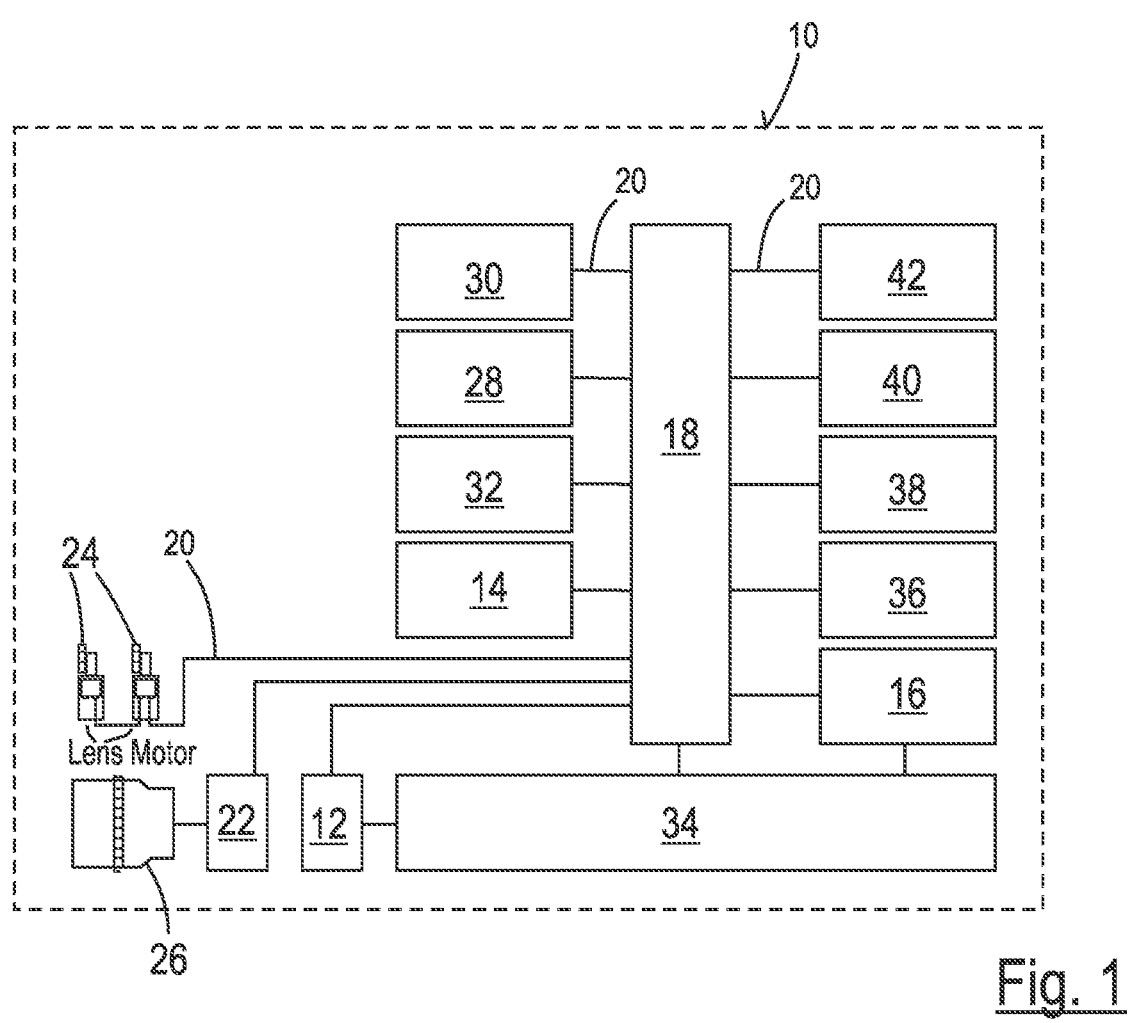

order to integrate the first and second camera module into the operation of the camera.

23 Claims, 5 Drawing Sheets

(56)                    References Cited

U.S. PATENT DOCUMENTS

| | | | |
|---|---|---|---|
| 2013/0111464 A1 | 5/2013 | Markas et al. | |
| 2014/0028435 A1* | 1/2014 | Brockway, III | H04N 23/667 |
| | | | 340/3.1 |
| 2018/0054595 A1* | 2/2018 | Odamaki | H04N 23/50 |
| 2019/0180783 A1 | 6/2019 | Van Hoff et al. | |
| 2019/0208181 A1 | 7/2019 | Rowell et al. | |
| 2021/0295560 A1* | 9/2021 | Dworakowski | H04N 17/002 |
| 2021/0306567 A1* | 9/2021 | Lauer | H04N 7/181 |
| 2024/0015394 A1* | 1/2024 | Yang | H04N 23/661 |
| 2024/0155218 A1* | 5/2024 | Kim | H04N 23/60 |

OTHER PUBLICATIONS

European Patent Office Search Report issued in Application No. 23155962.6, dated Mar. 15, 2023.

* cited by examiner

METHOD OF CONNECTING CAMERA MODULES TO A CAMERA

The present invention relates to a method of connecting camera modules to a camera.

Professional film cameras are, for example, used in film and television productions. A large number of accessories and extension modules exist for such film cameras. Such accessories may, for example, comprise remote controls, monitoring units, motors and the like.

However, in the development of the camera and the accessories, there are great dependencies between the camera and the accessories since the camera has to communicate with the accessories and has to support the functions of the accessories. To ensure interoperability between the camera and the accessories, it is therefore often necessary to develop new software and/or firmware for the camera and/or the accessories. This process is time-consuming and prevents a fast and flexible connection of different accessories to the camera.

It is therefore the underlying object of the invention to provide a method of connecting camera modules to a camera that simplifies and accelerates the putting into operation of camera accessories at a camera.

This object is satisfied by a method in accordance with claim 1.

In the method in accordance with the invention, the camera is connected to a first camera module via a data interface. The first camera module transmits a device profile via the data interface to the camera, wherein the device profile comprises a device class of the first camera module and information about the functional scope of the first camera module. Furthermore, the camera is connected to a second camera module via the data interface. The second camera module transmits a device profile via the data interface to the camera, wherein the device profile comprises a device class of the second camera module and information about the functional scope of the second camera module. The camera adapts its operating parameters to the first and second camera module based on the device profiles in order to integrate the first and second camera module into the operation of the camera.

In other words, the camera therefore evaluates the device profiles of the connected camera modules in order e.g. to adapt the operation of the camera to the connected camera modules and, if necessary, to optimize it to the camera modules.

For this purpose, the camera may have a control unit that evaluates the device profiles of the first and second camera module. The control unit may in each case perform and/or initiate the method steps described herein.

A first camera module and a second camera module are respectively spoken of herein. It is understood that further additional camera modules may also be connected to the camera via the data interface, wherein the statements for the first and second camera module then apply accordingly to the further camera modules.

In accordance with the invention, it is made possible to provide a standardized data format by encapsulating and/or describing the functionalities of the camera modules by means of the device profiles, whereby a uniform format for exchanging capabilities and restrictions between the camera and the camera modules is provided. With the device profile, the camera modules in particular in each case communicate their requirements and also information about their functional scope to the camera.

Due to the transmission of the device profiles, the camera may then react sensibly to almost any camera modules and also to new camera modules without a change of the firmware and/or software of the camera being required, as explained in more detail below. The development effort for integrating new and/or other accessories (i.e. camera modules) may thus be significantly reduced.

Due to the connection and the integration into the operation of the camera, the first and second camera module itself becomes part of the camera. The first and/or second camera module may in particular only make the camera fully functional, for example, when one of the camera modules is a lens or an image acquisition module.

After connecting the camera modules via the data interface, an exchange of the device profiles may also take place. This means that the first and/or second camera module also receives/receive the device profiles via the data interface from camera modules already present in the camera. The first and/or second camera module may then preferably also adapt its/their operation to the already present camera modules.

To integrate the first and second camera module into the operation of the camera, the camera changes its operating parameters. The operating parameters may, for example, define the data format and/or the protocol by means of which communication with the first and second camera module takes place via the data interface. However, the operating parameters may also, for example, comprise a frame rate and/or or a resolution of the camera images acquired by the camera. If a memory module is, for example, connected as the first camera module to the camera and at most supports a resolution of 4K at a frame rate of 60 FPS, the operating parameters may be set such that camera images with a resolution of 4K and a frame rate of 60 FPS are generated and/or are transmitted at least in this format to the memory module. In general, the operating parameters are to be understood as all the settings of the camera that may have an effect on the operation of the camera.

Due to the device class included in the device profile, the camera may adapt its operating parameters e.g. to a standard device, in particular a predefined standard device, of this device class. In this way, newly developed camera modules may also be integrated into the operation of the camera even if the newly developed camera modules have functions that are not supported by the camera. In this case, at least basic functions (e.g. the functions of the standard device) may nevertheless be usable. For example, a novel distance measurement system that has a plurality of measurement points may nevertheless be used at an existing camera since it is recognized as belonging to the distance measurement system device class and e.g. also provides a value that corresponds to an existing single-point distance measurement device. In this way, a software update for existing devices may be avoided during the market launch of new camera modules.

Through (standardized) device profiles, it is furthermore made possible to avoid high testing efforts by testing all the possible combinations of cameras and camera modules. In particular, only a testing against specifications in a (standardized) device profile may take place since the properties of the camera modules are described in the device profile and not only in the program logic/software of the camera.

Overall, the transmission of the device profiles and the subsequent adaptation of the operating parameters thus enables the simple, fast and flexible connection of almost any desired camera modules to the camera.

The camera is in particular a camera for professional film recordings, in particular configured for recording moving images (videos), still images and single images and/or time lapse recordings, wherein the camera may e.g. have an exchangeable lens. The camera (or the image acquisition module) may e.g. be configured for recording image data at a resolution of at least 4K, 4.5K or 8K at frame rates of 60 FPS, 90 FPS, 100 FPS or 150 FPS.

Advantageous further developments of the invention can be seen from the description, from the dependent claims and from the drawings.

In accordance with a first embodiment, the first and the second camera module transmit the device profiles via the same data interface to the camera. This means that the camera modules use a data interface of the same kind that in particular uses the same protocol and/or the same data format for the transmission of the device profile of the first camera module and the device profile of the second camera module. However, the data interface may mechanically e.g. have a plurality of and/or different plug-in connections for the different camera modules. The different plug-in connections may be connected internally in the camera e.g. via a bus and/or a network. Alternatively, the camera modules may also transmit the device profiles via the same data interface.

The device profiles may, for example, be transmitted in the form of an XML (Extensible Markup Language) file, a JSON (JavaScript Object Notation) file or the like.

Furthermore, the format in which the device profiles are transmitted may likewise be uniform.

In accordance with a further embodiment, the data interface comprises a data network, wherein the data network comprises an Ethernet network, a fieldbus network or a non-IP network (NIN) or is such a network. Ethernet, for example, defines wired data networks with transmission rates between 1 Mbit and 4 Gbit. In an Ethernet network, both the physical layer (OSI Layer 1) and the data link layer (OSI Layer 2) are predefined. The data network may at least sectionally also be formed by a WLAN (Wireless Local Area Network). In this case, one or more camera modules and/or the distribution unit may comprise a WLAN transceiver so that camera modules may also be integrated into the data network by means of WLAN.

A fieldbus network may, for example, provide a real-time capability. The fieldbus network may alternatively or additionally be Ethernet-based. The fieldbus network may, for example, be EtherCAT, EIP, Sercos III and the like. The non-IP network (NIN) may in particular be a stream-based network instead of a packet-based network.

The first and/or second camera module may therefore be connected to the data network, wherein, after the connection, the camera modules log on to the camera with their device profiles. Due to the transmission of the device profiles to the camera, the first and second camera module may then in particular be automatically added to the camera. In addition to the connection by means of the data interface (e.g. the data network), the camera modules may at least partly also be mechanically fastened to the camera.

The same protocol or the same protocols is/are preferably used for the first and second camera module (or for all the camera modules) to transmit the device profiles. For example, TCP (Transmission Control Protocol) and/or UDP (User Datagram Protocol) may be used as protocols. Furthermore, RTP (Real-Time Transport Protocol) may be used, in particular for real-time critical data. Different camera modules may use the same protocol for transmitting data via the data network, wherein the physical layer (OSI Layer 1) and/or the data link layer (OSI Layer 2) may, however, be different. For example, optical waveguides (e.g. from Gbit/s onward) may be used for connections with a high data throughput; copper cables may be used for other connections.

In accordance with a further embodiment, the camera is a modular electronic camera, and in particular a distributed electronic camera, wherein the camera has an image acquisition module comprising an image sensor and an image processing unit coupled to the image sensor. The camera in particular comprises a first functional module, for example an operating module for controlling and/or configuring the camera. The camera in particular comprises a second functional module, for example a display module for displaying camera images acquired by the image sensor. The image acquisition module and the functional modules are camera modules in this respect. The camera modules are e.g. connected to one another by means of a data network. The data network for connecting the image acquisition module and the functional modules may be the same data network with which the first and second camera module also transmit the device profile. The data network preferably has a distribution unit that receives data via the data network from the camera modules and forwards data from one of the camera modules to at least one of the other camera modules. The camera modules included in the camera, i.e. the image acquisition module, the operating module and/or the display module, may also have originally reported to the control module with their device profile. When switching on the camera, the control module may query the device profiles of all the camera modules connected via the data interface or the data network every time and may adapt the operating parameters accordingly.

The image processing unit preferably converts the camera into a digital format that may be sent via the data network. The camera images may be available as single images and/or as video. For example, the camera images may be transmitted as a stream via the data network.

A functional module in particular serves to provide a respective portion of the functions of the camera. A functional module may be one of the camera modules mentioned herein.

The operating module may have a human-machine interface (HMI), for example in the form of a touch screen or an arrangement of switches and/or a display. The operating module may, for example, serve to start and/or to stop the recording of camera images, to set a frame rate when recording camera images, a color depth and the like.

The distribution unit preferably comprises a network switch, a hub, a router and/or a gateway. The distribution unit may also be one of the network components mentioned. The distribution unit preferably has network ports to each of which a camera module may be connected. The ports may support different transmission speeds, for example, 10 Mbit, 100 Mbit, 1 Gbit, 10 Gbit, 100 Gbit or 400 Gbit.

If the distribution unit is a hub, all the data arriving from the camera modules at the distribution unit will be forwarded to all the other camera modules. In the case of a switch, a router and/or a gateway, the incoming data may be forwarded in a targeted manner to specific camera modules. For this purpose, the distribution unit then includes information about which camera module is connected to which network port. By using, for example, a switch, there is thus the advantage that data intended only for a respective camera module are forwarded to this camera module by the distribution unit. The present transmission bandwidth of the data network is consequently not unnecessarily exhausted.

In accordance with a further embodiment, the distribution unit is designed in a cascaded manner and/or from part units.

Therefore, the distribution unit may, for example, be "stacked" or have sub-units ("cascaded"). It is only relevant that the components of the distribution unit may communicate with one another so that a communication of the camera modules among one another is possible via the data network. Alternatively, the possibility exists of the distribution unit having only exactly one component, for example, only one switch.

In distributed and/or cascaded distribution units, it is also possible for at least some of the camera modules to each comprise a part of the distribution unit. For example, some of the camera modules may each have their own switch so that a plurality of such camera modules may be connected in a chain by means of network cables. In this respect, each camera module may, for example, have at least two network sockets.

In accordance with a further embodiment, the first and/or second camera module is/are or comprises/comprise one of the following:

a image acquisition module,
a memory module,
a playback module,
a display module,
an audio module,
a lens,
a distance measurement module,
a battery module,
a position detection module,
a (radio) communication module,
a remote control module.

In the image acquisition module, an image sensor may be coupled to associated electronics, wherein the associated electronics are, for example, designated as an image processing unit. The image processing unit may e.g. effect a power supply, a temperature stabilization and/or a cooling of the image sensor. The image processing unit may furthermore be configured to read out the camera images acquired by the image sensor and to observe a predefined timing and/or a triggering during the readout.

The display module preferably comprises a screen on which, for example, the camera images currently acquired by the image acquisition module may be displayed. The display module may, for example, be a viewfinder (Electronic View Finder—EVF) or a monitor in general.

The memory module may be a recorder in the data network that stores the camera images.

The playback module may play back stored camera images, for example, on a display. Alternatively, the playback module may play out the stored camera images as a stream into the network so that the stored camera images may, for example, be output on a display module.

In the device profile, the battery module may e.g. communicate its maximum capacity, its maximum output current and/or its output voltage to the camera. In this way, the camera may, for example, determine the maximum power available and may thus avoid an overloading of the battery module.

The position detection module may detect its position in space (and thus that of the camera or other camera modules). The (radio) communication module may generally be configured for (radio) communication with further modules. The remote control module may enable a remote control of at least one or more camera modules.

In accordance with a further embodiment, the first and/or second camera module comprises/comprise a universal operating module, wherein the universal operating module may be configured for the operation of different camera functions. The universal operating module preferably comprises a smartphone and/or a tablet. The universal operating module may, for example, be set or configured by a user in order e.g. to control various other camera modules and thus camera functions. The device profile transmitted from the universal operating module to the camera may be adapted accordingly, in particular automatically, to the respective configuration of the universal operating module. Thus, the universal operating module may e.g. be configured for the control of a lens motor, whereupon the device profile of the universal operating module communicates to the camera that the control of a lens motor is possible. However, if the universal operating module is e.g. configured for the control of a playback module, the device profile of the universal operating module communicates to the camera that the control of a playback module is possible.

The universal operating module may e.g. be a smartphone. Thus, which camera function or which camera module is to be controlled by the universal operating module may e.g. then be selected in a menu on the screen of the universal operating module. Thereupon, the above-mentioned adaptation of the device profile of the universal operating module then takes place. Alternatively or additionally, it is also possible to enter the device profile directly into the universal operating module and/or to change it at the universal operating module.

The universal operating module may e.g. be connected by WLAN to the camera so that a simple and location-independent control of camera functions becomes possible. It is understood that the rights management explained below may also apply to the universal operating module so that unauthorized access to camera functions may be prevented.

A plurality of display modules may in particular e.g. be connected to the data network and may thus be integrated into the camera. The display modules may e.g. receive the same image data via the data network. The display modules may have an image processing unit that carries out a modification to the image data before the image data are displayed. Due to the modification, a false color representation may e.g. be performed on one display module, but a color change may be performed on another display module. Due to the image processing units in the display modules, the camera or, more precisely, the image acquisition module advantageously does not have to provide different image data. The computing requirements for the image acquisition module or a processor module may thus decrease, whereby the camera may be more energy-efficient, smaller and/or more compact.

The audio module may serve for inputting and/or outputting sound signals. The main application of the audio module may be the acquisition and processing of audio signals for the sound recording. However, the audio module may also be part of an intercom system by which voice messages are transmitted between different people (e.g. camera operators).

In addition to the lens, the first and/or second camera module may also be or comprise a lens recording module. The lens recording module may, for example, allow the control of a focus motor and/or an aperture motor.

The distance measurement module may preferably be configured to determine distances between the image acquisition module and objects to be recorded.

The device class in the device profile of a corresponding camera module may accordingly, for example, be an "image acquisition module", a "memory module", a "display module", etc. The device class may furthermore comprise one or more subclasses, e.g. "Prime" lens or "Zoom" lens may be specified as a subclass in the lens device class.

In accordance with a further embodiment, the information about the functional scope of the image acquisition module comprises a frame rate functional scope of the image acquisition module, a frame rate range (FPS range), a frame rate granularity (FPS granularity), a sensitivity range (for example, in ASA or ISO), possible image formats, and/or possible resolutions.

Alternatively or additionally, the information about the functional scope of the audio module may comprise the audio inputs present and/or the audio outputs present and/or supported codecs.

In a corresponding manner, other camera modules may each specify properties characteristic of the camera module in the information about the functional scope. A unique identification with which a camera module may be uniquely identified may furthermore be included in the information about the functional scope.

In accordance with a further embodiment, the device profile of at least one camera module has a plurality of device classes, wherein information about the functional scope of the camera module is acquired for each device class. In this respect, the plurality of device classes and the information about the functional scope are transmitted to the camera. The camera then considers both device classes and all the information about the functional scope of the two device classes when adapting the operating parameters. Such a camera module, which may be associated with a plurality of device classes, may also be referred to as a composite module. For a composite module, the transmission of the device profile and the adaptation of the operating parameters may each be performed separately, as described above.

In accordance with a further embodiment, the device profile of at least one camera module is automatically transmitted to the camera and/or the camera automatically performs the adaptation of its operating parameters. Both the transmission of the device profiles and the adaptation of the operating parameters may thus take place without action by the user. A "plug and play" functionality may thus result for the connection of camera modules.

In accordance with a further embodiment, the camera adapts the operating parameters such that a power consumption of the camera is minimized when providing the resources required by the camera modules. The required resources are to be understood such that the frame rates, color depths and/or data paths that are e.g. required by the camera modules are provided. To optimize the power consumption of the camera, the camera may, for example, in each case determine the minimum requirements (viewed across all the camera modules) from the device profiles, wherein the minimum requirements are then mapped in the operating parameters. In particular, the camera may e.g. be operated with a frame rate or a resolution that corresponds to the minimum requirement viewed across all the camera modules. An unnecessarily high frame rate or resolution and, associated therewith, an increased power consumption are thus avoided.

In particular, due to e.g. special low-power profiles of the device profiles, dynamically determined processing steps may e.g. be blocked in the camera in this way and may then be taken over by devices outside the camera. Such a low-power profile may in particular be activated at at least one of the camera modules. It is hereby possible for the user to operate battery-powered cameras (e.g. handheld cameras) in as power-saving a manner as possible without having to manually resolve all the dependencies between the camera modules.

In accordance with a further embodiment, at least one device profile comprises dependencies on other device profiles. The device profile may therefore describe dependencies. For example, a focus module may mention a certain class of lenses as a dependency if the focus module and/or its focus motor is only e.g. designed for that class of lenses.

In accordance with a further embodiment, a warning signal is output in the event of missing and/or incorrect and/or unknown device classes and/or information about the functional scope of a camera module. The warning signal may, for example, be a note to the operator of the camera that is output via a display or by sound. Despite the warning signal, the camera module may nevertheless be integrated into the operation of the camera. Missing, incorrect and/or unknown information may e.g. be ignored or offset by a standard value. Information that is therefore unknown or cannot be processed may accordingly be treated such that no functional problems occur during the operation of the camera.

In accordance with a further embodiment, at least one of the device profiles comprises authentication information that preferably enables a verification of the camera module that is actually connected. The authentication information may e.g. be a license key. The license key may, for example, be checked with an algorithm or against a database. Alternatively or additionally, a digital signature is e.g. included in the authentication information. The camera may then, for example, store public keys from approved manufacturers for camera modules and may verify the digital signature based on the public keys.

Preferably, only camera modules whose authentication information is valid and/or accepted by the camera are integrated into the operation of the camera. Due to the authentication information, it may be avoided that unwanted camera modules are integrated into the operation of the camera and, for example, cause malfunctions.

In accordance with a further embodiment, a system profile is activated for the camera, wherein the system profile, in particular only, sets some of the operating parameters, wherein the system profile is considered when adapting the operating parameters to the device profiles. The camera may also comprise a plurality of different system profiles of which in each case exactly one may be activated at a point in time. Based on the system profiles, different basic settings of the operating parameters and/or of an operating module may be made, wherein different functional scopes may be enabled by the basic settings. For example, one basic setting may be adapted for a stand-alone operation in cinema productions, another basic setting may be adapted for the operation as a shoulder-mounted camera, and a further basic setting may be adapted for the use in a multi-camera composite. In a stand-alone operation, the operating parameters may, for example, be selected such that settings are prioritized that are made directly at the camera. In a multi-camera operation, in contrast, the operating parameters may be selected such that settings are e.g. prioritized via a remote control.

Due to the system profiles, predefined application scenarios may be provided to the user that map established work routines on the film set and thus avoid a complex initial configuration for the user. Consequently, the camera may be used faster and more flexibly.

In accordance with a further embodiment, a user profile is activated for the camera, wherein the user profile, in particular only, sets some of the operating parameters of the camera, wherein the user profile is considered when adapting the operating parameters to the device profiles. In contrast to the system profiles, user profiles preferably allow the free configuration of the operating parameters by the user. This free configuration of the operating parameters may then be saved as a user profile. In this way, suitable profiles may be created by the user for the respective application on set.

The operating parameters may comprise a rights management that allows access to predetermined functions of the camera only with the appropriate rights. Thus, profiles having a corresponding rights management may, for example, be created by the user profiles, wherein e.g. the switching between recording and playback is only allowed for certain camera modules, whereas other camera modules are e.g. only given the possibility for a color space adaptation.

In accordance with a further embodiment, the operating parameters comprise a rights management that defines which user and/or which camera module may control and/or configure which other camera modules and to what extent. In dependence on the rights management, provision may thus e.g. be made that certain camera modules may only be displayed low resolutions and/or image data with a digital watermark. Alternatively or additionally, predetermined setting possibilities at camera modules may be blocked for certain camera modules by the rights management. Such a rights management is, for example, useful in cloud-based workflows with an image transmission to remote camera modules that serve as viewing stations.

The management of the user profiles may either take place via the camera itself or also via external applications, for example, apps or cloud services. The user profiles may furthermore, in particular by means of the data network, be transferred from one camera to another so that a complex and/or expensive setting procedure may be omitted there.

Furthermore, it is possible that settings in the user profiles are bound to predefined device classes. This means that these settings are only activated when a camera module from the predetermined device class is integrated into the camera.

In accordance with a further embodiment, when a plurality of camera modules of the same device class are connected, a prioritization of the camera modules of the same device class based on the device profiles and/or the currently active system profile and/or the currently active user profile takes place. Therefore, if a plurality of camera modules of the same kind are integrated into one camera, the operating parameters may be set differently based e.g. on the system profile and/or the user profiles. The same may apply to camera modules that allow settings of the same kind. Accordingly, when a plurality of camera modules that allow settings of the same kind are connected, a prioritization of the camera modules based on the device profiles and/or the currently active system profile and/or the currently active user profile may take place. If two camera modules, for example, allow the setting of the focus, a rear camera focus control may be given a higher priority than a radio focus control in a currently selected system profile for a multi-camera operation (multi-cam). If a remote operation is activated as the system profile, the prioritization could be reversed.

It is likewise possible that, when connecting a plurality of camera modules of the same device class, e.g. when connecting two lens motors, the camera assigns different roles and thus different functions to these camera modules. For this assignment, a bidirectional communication with the camera modules may take place. Thus, one of the two lens motors may then be entrusted with the role of the focus motor, but another one may be entrusted with the role of the aperture motor.

A further subject of the invention is a camera system comprising a camera and at least a first and a second camera module, wherein the camera is connected to the first and second camera module via a data interface, wherein the first camera module is configured to transmit a device profile via the data interface to the camera, wherein the device profile comprises a device class of the first camera module and information about the functional scope of the first camera module, the second camera module is configured to transmit a device profile via the data interface to the camera, wherein the device profile comprises a device class of the second camera module and the information about the functional scope of the second camera module, the camera is configured to adapt its operating parameters to the connected camera modules based on the device profiles.

Furthermore, the invention relates to a camera module comprising a data interface, wherein the camera module is configured to transmit a device profile via the data interface to the camera, wherein the device profile comprises a device class of the camera module and information about the functional scope of the camera module.

Finally, the invention also relates to a camera comprising a data interface, wherein the camera is configured to receive a device profile via the data interface from a camera module, wherein the device profile comprises a device class of the camera module and information about the functional scope of the camera module, wherein the camera is configured to adapt its operating parameters to the connected camera module based on the device profile.

The statements on the method in accordance with the invention apply accordingly to the camera system in accordance with the invention, the camera module in accordance with the invention and the camera in accordance with the invention. This in particular applies with respect to advantages and embodiments. It is understood that all the embodiments mentioned herein are combinable with one another, unless explicitly stated otherwise.

The invention will be described purely by way of example with reference to the drawings in the following. In this respect, the modular camera will first be generally described. Subsequently, the device profiles and the possibility of monitoring on different display modules will be looked at.

Figure 2:
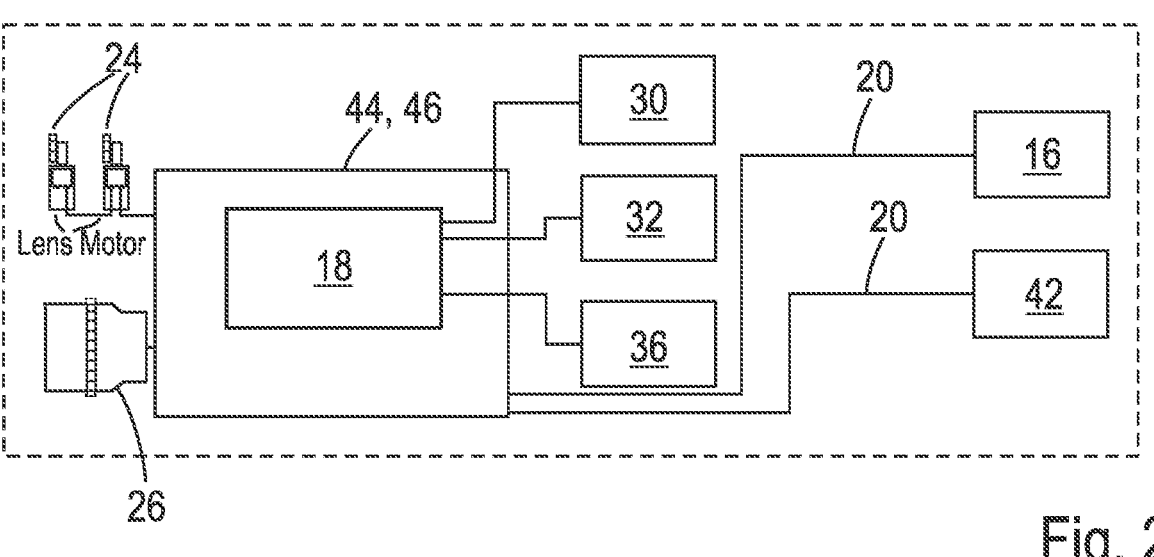
Figure 3:
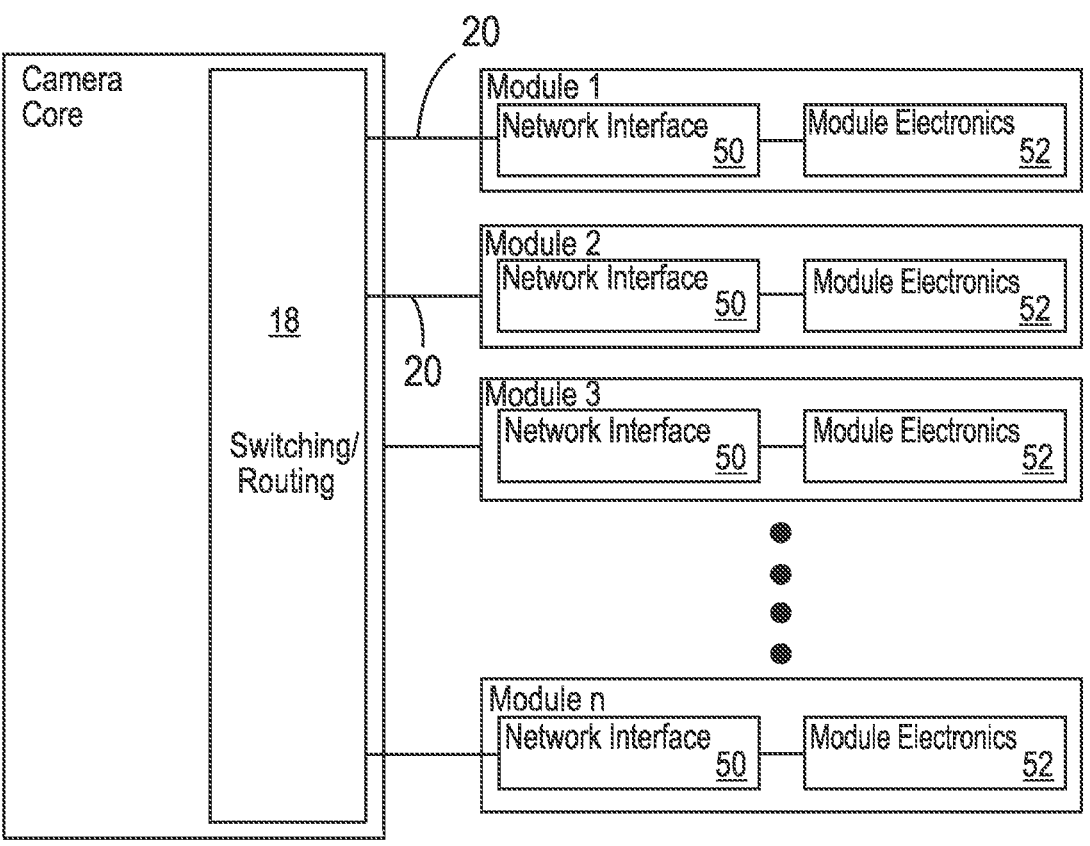
Figure 4:
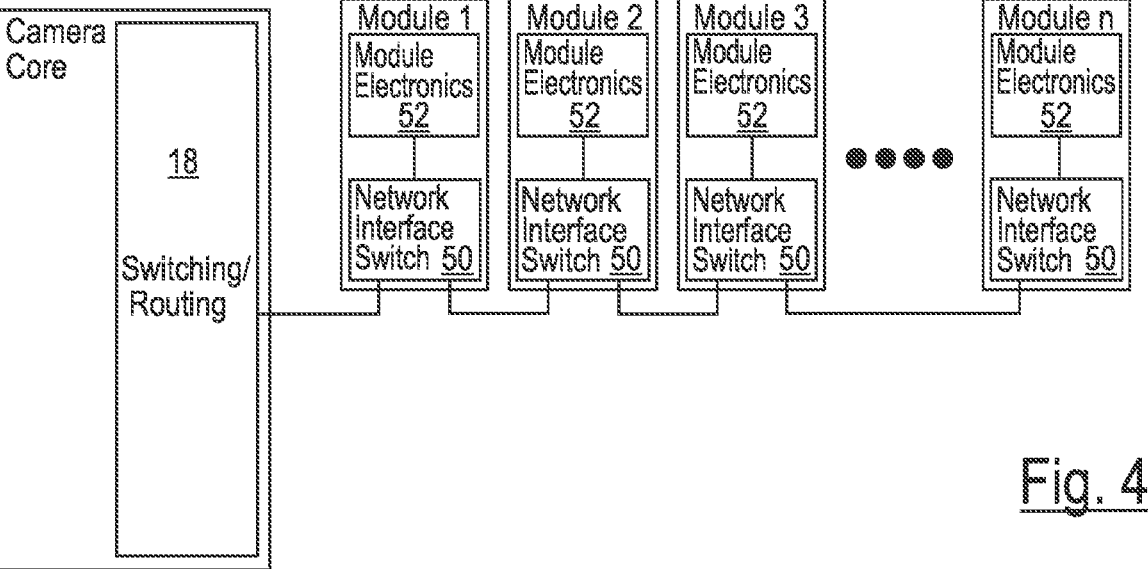
Figure 5:
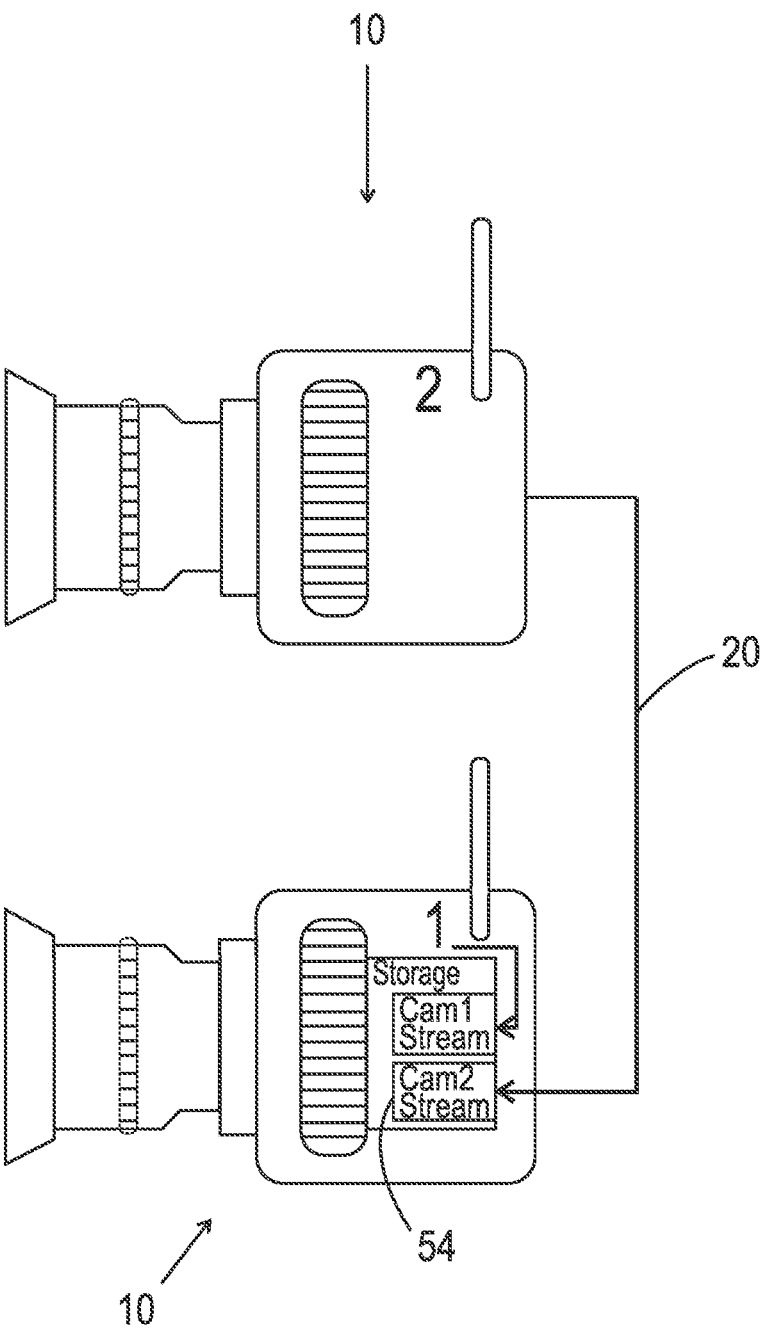
Figure 6:
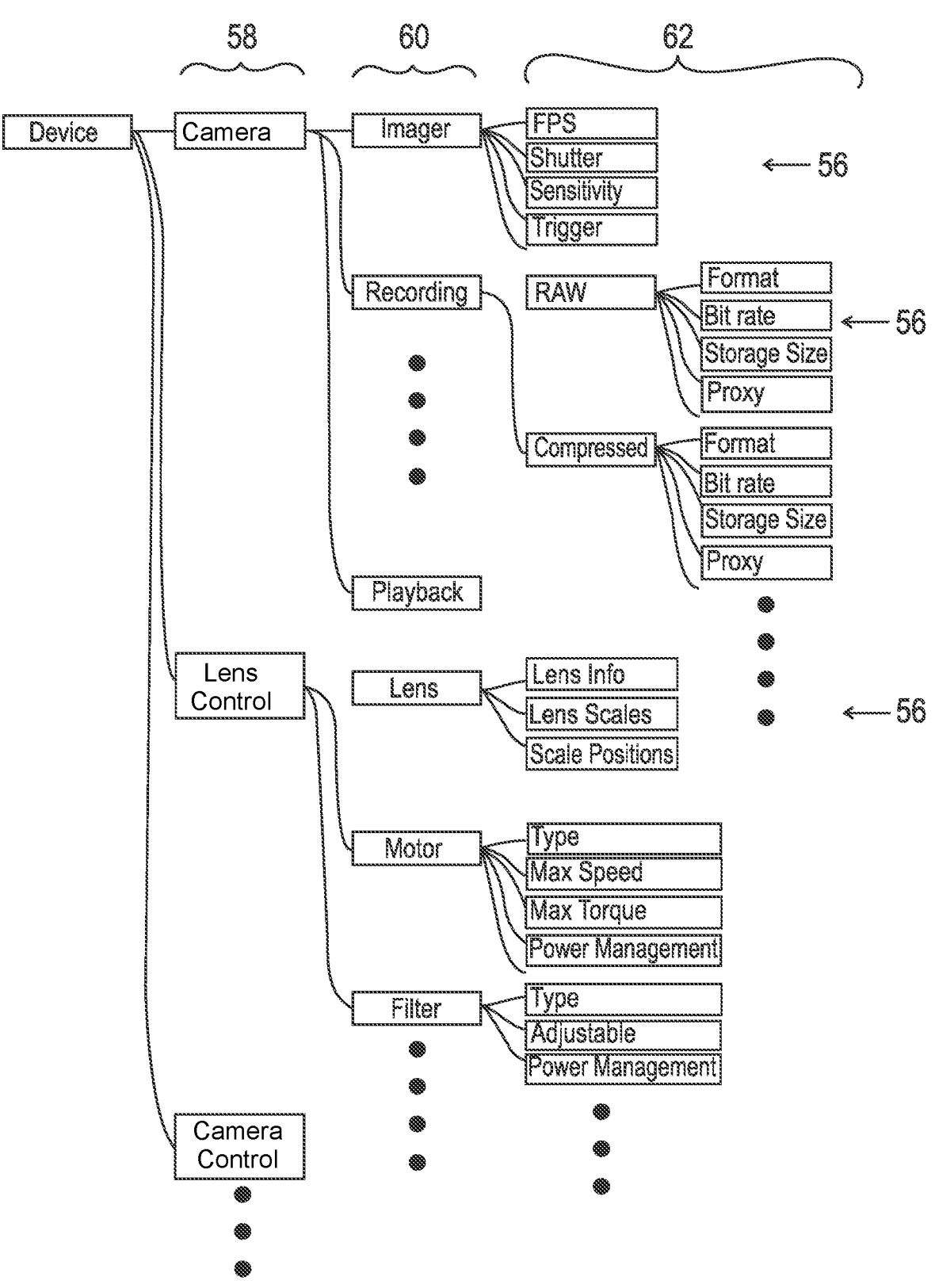
Figure 7:
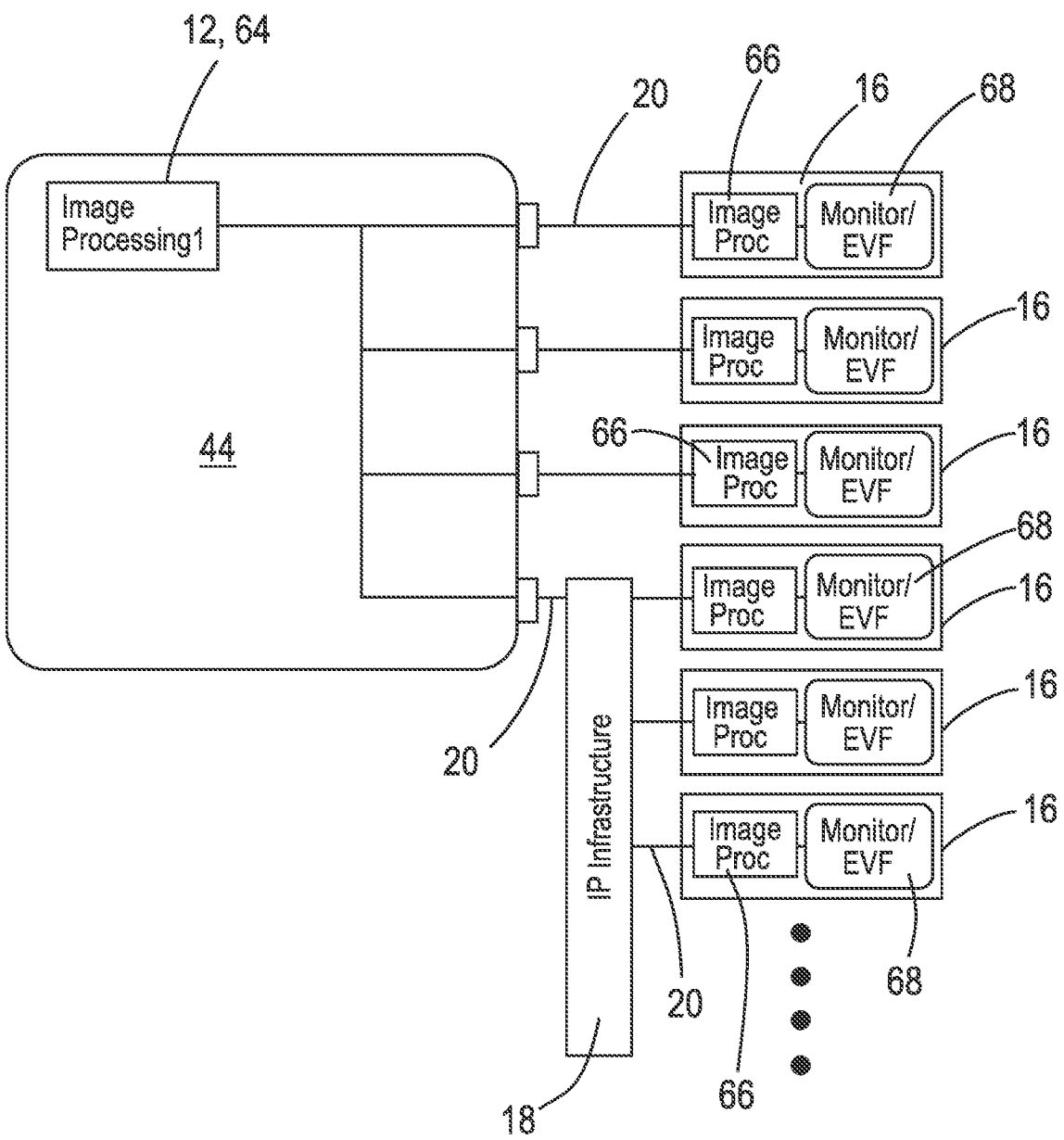

There are shown:

FIG. 1 schematically, a modular electronic camera comprising a distribution unit;

FIG. 2 schematically, the spatial arrangement of the camera modules of the electronic camera of FIG. 1;

FIG. 3 a schematic view of camera modules in accordance with a first embodiment that are connected to a data network;

FIG. 4 schematically, a view of camera modules in accordance with a second embodiment that are connected to a data network;

FIG. 5 the coupling of two cameras via a data network;

FIG. 6 schematically, the division of device profiles into device class and information about the functional scope; and FIG. 7 schematically, display modules that are coupled via a data network and that receive image data from a transmission module.

FIG. 1 shows a camera 10 comprising an image acquisition module 12 that has an image sensor and an image processing unit. The camera 10 further comprises an operating module 14 that serves to control and/or to configure the camera 10.

The camera 10 furthermore comprises a display module 16, e.g. a viewfinder, that displays camera images acquired by the image sensor.

The image acquisition module 12, the operating module 14 and the display module 16 are camera modules and are each coupled to a distribution unit configured as a switch 18 via Ethernet connections 20. The operating module 14 and the display module 16 may also be designated as the first and the second functional module.

The camera 10 comprises even further camera modules, namely a lens recording module 22, wherein the lens recording module 22 is divided into a plurality of part modules and has motors 24 for adjusting a lens 26 and a motor control 28 for controlling the motors 24. The motors 24, the lens 26 and the motor control 28 could alternatively also be considered as separate camera modules.

Further camera modules of the camera 10 are a camera positioning module 30, an audio module 32, a processor module 34, a conversion module 36, a radio module 38 and a connection module 40. Finally, the camera 10 may also comprise a second display module 42.

All of the camera modules 12, 14, 16, 22, 30, 32, 34, 36, 38, 40, 42 are coupled to the switch 18 via Ethernet connections 20. The Ethernet connections 20 may be configured as copper cables or also as optical waveguides.

The switch 18 in each case receives data from the camera modules and forwards the data to one or more other camera modules. In this respect, the camera modules use the same data network, namely a data network that is built up from switch 18 and the Ethernet connections 20 and that transmits data between the camera modules. The data network serves as a data interface between the camera modules. Through a simple connection to the data network, other and/or additional camera modules may thus be integrated into the camera 10.

FIG. 2 shows the spatial arrangement of the camera modules of the camera 10 of FIG. 1. As shown in FIG. 2, the camera 10 comprises a central unit 44 that has a separate housing 46. The switch 18 and all the camera modules not shown outside the central unit 44 are arranged in the central unit 44. The camera positioning module 30, the audio module 32 and the conversion module 36 are arranged outside the housing 46 of the central unit 44. These modules may be mechanically attached to the housing 46 of the central unit 44. In contrast, the display module 16 and the second display module 42 are spaced apart and are attached outside the housing 46 and are in particular only connected via the Ethernet connections 20 to the central unit 44 and thus to the switch 18. Due to the outsourcing of camera modules, the part of the camera 10 that usually has to be moved may be designed as smaller and more manageable.

FIG. 3 and FIG. 4 show two different embodiments of the configuration of the data network. In particular from FIG. 3 and FIG. 4 onward, camera modules are generally shown with the reference numeral 48. In accordance with the first embodiment of FIG. 3, the camera modules 48 each have their own network interface 50, i.e. their own hardware for connecting an Ethernet connection 20. The camera modules 48 furthermore each comprise module electronics 52 that control the communication via the Ethernet connection 20 and that e.g. comprise a protocol stack. In accordance with the embodiment of FIG. 3, the camera modules 48 are each directly connected to the switch 18 via an Ethernet connection 20. In contrast, the camera modules 48 in accordance with the second embodiment of FIG. 4 each comprise the functionality of a hub or a switch in their network interface 50 and may accordingly, as shown in FIG. 4, be connected in the form of a chain. In the embodiment of FIG. 4, only one camera module 48 is directly connected to the switch 18 via an Ethernet connection 20. This directly connected camera module 48 comprises a further Ethernet connection 20 that connects the next camera module 48. Thus, the data of the next camera modules 48 first run via the camera module 48 directly connected to the switch 18 and are then forwarded to the switch 18, if necessary.

FIG. 5 shows the connection of two cameras 10 via an Ethernet connection 20. Due to the Ethernet connection 20 between the two cameras 10, the data networks of the cameras 10 may be connected to one another so that the camera modules 48 of the one camera 10 may access the camera modules 48 of the other camera 10. For example, the camera 10 shown at the bottom in FIG. 5 may have a memory module 54 that is used by both cameras 10 to store the generated image data.

It can be seen that a great flexibility in the structure of the camera 10 may be achieved by the modular design of the camera 10 by means of the camera modules 48. Furthermore, the camera 10 may be kept small and light for the operation so that advantages result on the film set. The data network may furthermore be easily coupled to further cameras to enable an outsourcing of functionalities from one camera 10 to another to allow a synchronization of cameras 10 for 3D recordings or to enable a control of a plurality of cameras 10 from a central point.

Device profiles of camera modules 48 are schematically shown in FIG. 6. The device profiles 56 each comprise a device class 58, i.e., for example, "camera", "lens control" or "camera control". The device classes 58 each also comprise subclasses 60 that define the device class in more detail. Information about the functional scope 62 is specified for each device class 58 and/or for each subclass 60, said information, for example, reproducing the capabilities of a camera, e.g. whether the camera can handle a RAW format or a compressed format.

If it is now assumed by way of example for the camera 10 shown in FIG. 2 that the camera positioning module 30 and the audio module 32 are connected to the camera 10, a connection to the data network or the data interface of the camera is first established by means of the Ethernet connection 20 for the camera positioning module 30 and the audio module 32. A control unit (not shown) of the camera 10, which is, for example, arranged in the central unit 44 or which may be part of the processor module 34, effects the transmission of the device profiles 56 from the camera positioning module 30 and from the audio module 32 to the camera 10 after the connection has been established. The transmission of the device profiles may, for example, take place in the form of an XML file and/or a JSON file.

After receiving the device profiles 56, the device profiles are evaluated and operating parameters of the camera 10 are adapted based on the device profiles 56. Thus, a transmission of audio signals to the audio module 32 may, for example, be activated. Furthermore, the position information output by the camera positioning module 30 may, for example, be forwarded to the processor module 34. To set up such data connections, the operating parameters of the camera 10 are changed accordingly.

Finally, in FIG. 7, the display of different variants of camera images is shown. FIG. 7 shows a transmission module 64 that is part of the image acquisition module 12. The transmission module 64 is connected to a plurality of display modules 16 via the data network, i.e. via Ethernet connections 20. A portion of the display modules 16 is directly connected to the central unit 44. Another portion of the display modules 16 is connected to the transmission module 64 via a further switch 18. Further display modules 16 may in particular be connected via the further switch 18 so that the number of display modules may be easily scaled.

Each of the display modules comprises an image processing unit 66.

During the operation of the camera 10, image data generated by the image acquisition module 12 are transmitted from the transmission module 64 to the display modules 16, wherein the transmission module 64 only performs a scaling and/or a compression of the image data. The image data are received from the display modules 16 and are in each case modified by means of the image processing unit 66 before the image data are displayed on displays 68 of the display modules 16. For example, a color grading, a false color representation, the display of overlays and the like may be performed by the image processing units 66.

Due to the network-based playout of the image data, it is possible to simultaneously provide different display modules 16 with image data without placing a high load on the computing resources of the camera 10. A flexible design of the monitoring for different application purposes is thus made possible.

REFERENCE NUMERAL LIST 10 camera
12 image acquisition module
14 operating module
16 display module
18 switch
20 Ethernet connection
22 lens recording module
24 motor
26 lens
28 motor control
30 camera positioning module
32 audio module
34 processor module
36 conversion module
38 radio module
40 connection module
42 second display module
44 central unit
46 housing
48 camera module
50 network interface
52 module electronics
54 memory module
56 device profile
58 device class
60 subclass
62 information about the functional scope
64 transmission module
66 image processing unit
68 display

The invention claimed is:

1. A method of connecting camera modules to a camera, in which
the camera is connected to a first camera module via a data interface, the first camera module transmits a device profile via the data interface to the camera, wherein the device profile comprises a device class of the first camera module and information about the functional scope of the first camera module,
the camera is connected to a second camera module via the data interface,
the second camera module transmits a device profile via the data interface to the camera, wherein the device profile comprises a device class of the second camera module and information about the functional scope of the second camera module,
the camera adapts its operating parameters to the first and second camera module based on the device profiles in order to integrate the first and second camera module into the operation of the camera,
wherein a system profile is activated for the camera, wherein the system profile sets some of the operating parameters of the camera, wherein the system profile is considered when adapting the operating parameters to the device profiles, and
wherein, when a plurality of camera modules of the same device class are connected, a prioritization of the camera modules of the same device class based on the device profiles and/or a currently active system profile and/or a currently active user profile takes place.

2. The method in accordance with claim 1, wherein the camera modules transmit the device profiles via the same data interface to the camera.

3. The method in accordance with The method in accordance with wherein the data interface comprises a data network, wherein the data network comprises an Ethernet network, a fieldbus network or a non-IP network.

4. The method in accordance with claim 1, wherein the camera is a modular electronic camera, wherein the camera has a display module and an image acquisition module comprising an image sensor and an image processing unit coupled to the image sensor, wherein the camera comprises an operating module for controlling and/or configuring the camera, wherein the image acquisition module, the operating module and the display module are camera modules, wherein the image acquisition module, the operating module and the display module are connected to one another by means of a data network, wherein the data network has a distribution unit that receives data via the data network from the camera modules and forwards data from one of the camera modules to at least one of the other camera modules.

5. The method in accordance with claim 4, wherein the camera is a distributed electronic camera.

6. The method in accordance with claim 1, wherein the first and/or second camera module comprises/comprise
an image acquisition module,
an operating module,
a memory module,
a playback module,
a display module,
an audio module,
a lens,
a distance measurement module, and/or
a battery module.

7. The method in accordance with claim 1, wherein the first and/or second camera module comprises/comprise a universal operating module, wherein the universal operating module can be configured for the operation of different camera functions.

8. The method in accordance with claim 7, wherein the universal operating module comprises a smartphone or a tablet.

9. The method in accordance with claim 6, wherein the information about the functional scope of the image acquisition module comprises a frame rate range, a frame rate granularity, a sensitivity range, possible image formats, and/or possible resolutions.

10. The method in accordance with claim 6, wherein the information about the functional scope of the audio module comprises audio inputs present and/or audio outputs present.

11. The method in accordance with claim 1, wherein the device profile of at least one camera module has a plurality of device classes, wherein information about the functional scope of the camera module is acquired for each device class, wherein the plurality of device classes and the information about the functional scope are transmitted to the camera.

12. The method in accordance with claim 1, wherein the device profile of at least one camera module is automatically transmitted to the camera.

13. The method in accordance with claim 1, wherein the camera automatically performs the adaptation of its operating parameters.

14. The method in accordance with claim 1, wherein the camera adapts the operating parameters such that a power consumption of the camera is minimized when providing resources required by the camera modules.

15. The method in accordance with claim 1, wherein at least one device profile comprises dependencies on other device profiles.

16. The method in accordance with claim 1, wherein a warning signal is output in the event of missing and/or incorrect and/or unknown device classes and/or information about the functional scope of a camera module.

17. The method in accordance with claim 1, wherein at least one of the device profiles comprises authentication information.

18. The method in accordance with claim 17, wherein the authentication information enables a verification of the camera module that is actually connected.

19. The method in accordance with claim 1, wherein a user profile is activated for the camera, wherein the user profile sets some of the operating parameters of the camera, wherein the user profile is considered when adapting the operating parameters to the device profiles.

20. The method in accordance with claim 17, wherein, when a plurality of camera modules of the same device class are connected, a prioritization of the camera modules of the same device class based on the device profiles and/or a currently active system profile and/or a currently active user profile takes place.

21. The method in accordance with claim 1, wherein the operating parameters comprise a rights management that defines which user and/or which camera module may control and/or configure which other camera modules and to what extent.

22. A camera system comprising a camera and at least a first and a second camera module, wherein the camera is connected to the first and second camera module via a data interface, wherein the first camera module is configured to transmit a device profile via the data interface to the camera, wherein the device profile comprises a device class of the first camera module and information about the functional scope of the first camera module, the second camera module is configured to transmit a device profile via the data interface to the camera, wherein the device profile comprises a device class of the second camera module and information about the functional scope of the second camera module, the camera is configured to adapt its operating parameters to the connected camera modules based on the device profiles, wherein the operating parameters comprise a rights management that defines which user and/or which camera module may control and/or configure which other camera modules and to what extent.

23. A method of connecting camera modules to a camera, in which the camera is connected to a first camera module via a data interface, the first camera module transmits a device profile via the data interface to the camera, wherein the device profile comprises a device class of the first camera module and information about the functional scope of the first camera module, the camera is connected to a second camera module via the data interface, the second camera module transmits a device profile via the data interface to the camera, wherein the device profile comprises a device class of the second camera module and information about the functional scope of the second camera module, the camera adapts its operating parameters to the first and second camera module based on the device profiles in order to integrate the first and second camera module into the operation of the camera, wherein the operating parameters comprise a rights management that defines which user and/or which camera module may control and/or configure which other camera modules and to what extent.

* * * * *